US009363753B2

(12) United States Patent
Damnjanovic et al.

(10) Patent No.: US 9,363,753 B2
(45) Date of Patent: Jun. 7, 2016

(54) SLEEP MODE FOR USER EQUIPMENT RELAYS

(75) Inventors: Aleksandar Damnjanovic, San Diego, CA (US); Naga Bhushan, San Diego, CA (US); Yongbin Wei, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/552,439

(22) Filed: Jul. 18, 2012

(65) Prior Publication Data

US 2013/0021932 A1 Jan. 24, 2013

Related U.S. Application Data (60) Provisional application No. 61/509,353, filed on Jul. 19, 2011.

(51) Int. Cl.
 H04W 52/02 (2009.01)
 H04W 76/04 (2009.01)
 H04W 48/12 (2009.01)
 H04W 4/26 (2009.01)
 H04W 88/04 (2009.01)

(52) U.S. Cl.
 CPC .......... *H04W 52/0229* (2013.01); *H04W 48/12* (2013.01); *H04W 52/0209* (2013.01); *H04W 76/048* (2013.01); *H04W 4/26* (2013.01); *H04W 52/0235* (2013.01); *H04W 88/04* (2013.01); *Y02B 60/50* (2013.01)

(58) Field of Classification Search
 USPC ........................................ 370/252, 310–350
 See application file for complete search history.

(56) References Cited

U.S. PATENT DOCUMENTS

| 8,493,887 | B2 | 7/2013 | Palanki et al. | |
|---|---|---|---|---|
| 2003/0165125 | A1* | 9/2003 | Moulsley | 370/331 |
| 2008/0062950 | A1* | 3/2008 | Voyer et al. | 370/342 |
| 2008/0219214 | A1 | 9/2008 | Chen et al. | |

(Continued)

FOREIGN PATENT DOCUMENTS

| WO | 2008107851 A2 | 9/2008 |
|---|---|---|
| WO | WO-2010059856 A1 | 5/2010 |

(Continued)

OTHER PUBLICATIONS

International Search Report and Written Opinion—PCT/US2012/047427—ISA/EPO—Dec. 6, 2012.

(Continued)

*Primary Examiner* — Warner Wong
(74) *Attorney, Agent, or Firm* — Patterson & Sheridan, LLP (57) ABSTRACT

Certain aspects of the present disclosure provide methods and apparatus for subframe muting and/or discontinuous reception (DRX) mode related to sleep mode for user equipment (UE) relays. One method generally includes measuring, at a UE functioning as a relay (i.e., a UE relay), signals of one or more other UEs functioning as relays during one or more particular subframes and reporting the measurements of the signals to an apparatus. Another method generally includes determining, at a first UE functioning as a relay, that no UEs are being served by the first UE; based on the determination, increasing an interval between broadcast signals; and transmitting the broadcast signals according to the increased interval.

32 Claims, 8 Drawing Sheets

(56) References Cited

U.S. PATENT DOCUMENTS

| | | |
|---|---|---|
| 2008/0219275 A1* | 9/2008 | Boariu et al. .................. 370/401 |
| 2008/0260000 A1 | 10/2008 | Periyalwar et al. |
| 2009/0227258 A1* | 9/2009 | Youn .................... H04B 7/2606 455/445 |
| 2009/0252128 A1* | 10/2009 | Yang et al. .................... 370/338 |
| 2009/0323616 A1* | 12/2009 | Zeller et al. .................. 370/329 |
| 2010/0136997 A1 | 6/2010 | Palanki et al. |
| 2010/0167743 A1 | 7/2010 | Palanki et al. |
| 2010/0323720 A1 | 12/2010 | Jen |
| 2011/0014922 A1 | 1/2011 | Jen |
| 2011/0019606 A1* | 1/2011 | Umeda et al. .................. 370/315 |
| 2012/0046030 A1* | 2/2012 | Siomina et al. ............... 455/423 |
| 2012/0113843 A1* | 5/2012 | Watfa et al. .................... 370/252 |
| 2012/0113844 A1* | 5/2012 | Krishnamurthy ............. 370/252 |
| 2012/0113847 A1* | 5/2012 | Narasimha et al. ........... 370/252 |
| 2012/0113961 A1* | 5/2012 | Krishnamurthy ............. 370/332 |
| 2012/0115527 A1* | 5/2012 | Narasimha et al. ........... 455/513 |
| 2012/0157082 A1* | 6/2012 | Pedersen et al. ............ 455/422.1 |
| 2012/0207044 A1* | 8/2012 | Johansson et al. ............ 370/252 |
| 2012/0213107 A1* | 8/2012 | Jang et al. .................... 370/252 |

FOREIGN PATENT DOCUMENTS

| | | |
|---|---|---|
| WO | WO-2010078271 A2 | 7/2010 |
| WO | 2010086979 A1 | 8/2010 |
| WO | WO-2010108134 A2 | 9/2010 |
| WO | 2011010515 A1 | 1/2011 |
| WO | WO2011103719 A1 | 9/2011 |
| WO | WO2011107154 A1 | 9/2011 |
| WO | WO2011148391 A2 | 12/2011 |

OTHER PUBLICATIONS

Partial International Search Report—PCT/US2012/047427—ISA/EPO—Oct. 15, 2012.

ZTE: "Measurement of Access Downlink of Type II Relay", 3GPP Draft; R1-092471 Measure Access Link, 3rd Generation Partnership Project (3GPP), Mobile Competence Centre; 650, Route Deslucioles; F-06921 Sophia-Antipolis Cedex; France, No. Los Angeles, USA; 20090623, Jun. 23, 2009, XP050350980 [retrieved on Jun. 23, 2009].

* cited by examiner

SLEEP MODE FOR USER EQUIPMENT RELAYS

CROSS-REFERENCE TO RELATED APPLICATION

This application claims priority to U.S. Provisional Application Ser. No. 61/509,353, filed on Jul. 19, 2011, which is expressly incorporated by reference herein in its entirety.

BACKGROUND

1. Field

Certain aspects of the disclosure generally relate to wireless communications and, more particularly, to sleep mode or other power-saving states for user equipment (UE) devices functioning as relays.

2. Background

Wireless communication networks are widely deployed to provide various communication services such as voice, video, packet data, messaging, broadcast, etc. These wireless networks may be multiple-access networks capable of supporting multiple users by sharing the available network resources (e.g., bandwidth and transmit power). Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, $3^{rd}$ Generation Partnership Project (3GPP) Long Term Evolution (LTE) networks, and Long Term Evolution Advanced (LTE-A) networks.

A wireless communication network may include a number of base stations that can support communication with a number of user equipment devices (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE. This communication link may be established via a single-input single-output, multiple-input single-output or a multiple-input multiple-output (MIMO) system.

Wireless communication systems may comprise a donor base station that communicates with wireless terminals via a relay node, such as a relay base station. The relay node may communicate with the donor base station via a backhaul link and with the terminals via an access link. In other words, the relay node may receive downlink messages from the donor base station over the backhaul link and relay these messages to the terminals over the access link. Similarly, the relay node may receive uplink messages from the terminals over the access link and relay these messages to the donor base station over the backhaul link. The relay node may, thus, be used to supplement a coverage area and help fill "coverage holes."

SUMMARY

Certain aspects of the present disclosure generally relate to sleep mode or other power-saving states for UE relays.

In an aspect of the disclosure, a method for wireless communications is provided. The method generally includes measuring, at a user equipment (UE) functioning as a relay, signals of one or more other UEs functioning as relays during one or more particular subframes and reporting the measurements of the signals to an apparatus.

In an aspect of the disclosure, a UE functioning as a relay for wireless communications is provided. The UE generally includes at least one processor and a transmitter. The at least one processor is typically configured to measure signals of one or more other UEs functioning as relays during one or more particular subframes. The transmitter is generally configured to report the measurements of the signals to an apparatus.

In an aspect of the disclosure, a UE functioning as a relay for wireless communications is provided. The UE generally includes means for measuring signals of one or more other UEs functioning as relays during one or more particular subframes and means for reporting the measurements of the signals to an apparatus.

In an aspect of the disclosure, a computer-program product for wireless communications is provided. The computer-program product generally includes a computer-readable medium having code for measuring, at a UE functioning as a relay, signals of one or more other UEs functioning as relays during one or more particular subframes and for reporting the measurements of the signals to an apparatus.

In an aspect of the disclosure, a method for wireless communications is provided. The method generally includes transmitting, to a first user equipment (UE) functioning as a relay, a first subframe pattern and receiving, from the first UE, a first indication of measurements of signals from one or more other UEs functioning as relays, the measurements made during one or more particular subframes according to the first subframe pattern.

In an aspect of the disclosure, an apparatus for wireless communications is provided. The apparatus generally includes a transmitter configured to transmit, to a first UE functioning as a relay, a first subframe pattern and a receiver configured to receive, from the first UE, a first indication of measurements of signals from one or more other UEs functioning as relays, the measurements made during one or more particular subframes according to the first subframe pattern.

In an aspect of the disclosure, an apparatus for wireless communications is provided. The apparatus generally includes means for transmitting, to a first UE functioning as a relay, a first subframe pattern and means for receiving, from the first UE, a first indication of measurements of signals from one or more other UEs functioning as relays, the measurements made during one or more particular subframes according to the first subframe pattern.

In an aspect of the disclosure, a computer-program product for wireless communications is provided. The computer-program product generally includes a computer-readable medium having code for transmitting, to a first UE functioning as a relay, a first subframe pattern and for receiving, from the first UE, a first indication of measurements of signals from one or more other UEs functioning as relays, the measurements made during one or more particular subframes according to the first subframe pattern.

In an aspect of the disclosure, a method for wireless communications is provided. The method generally includes determining, at a first UE functioning as a relay, that no UEs are being served by the first UE; based on the determination, increasing an interval between broadcast signals; and transmitting the broadcast signals according to the increased interval.

In an aspect of the disclosure, a first UE functioning as a relay for wireless communications is provided. The first UE generally includes a processing system and a transmitter. The processing system is typically configured determine that no UEs are being served by the first UE and to increase an interval between broadcast signals based on the determination. The transmitter is generally configured to transmit the broadcast signals according to the increased interval.

In an aspect of the disclosure, a first UE functioning as a relay for wireless communications is provided. The first UE generally includes means for determining that no UEs are being served by the first UE, means for increasing an interval between broadcast signals based on the determination, and means for transmitting the broadcast signals according to the increased interval.

In an aspect of the disclosure, a computer-program product for wireless communications is provided. The computer-program product generally includes a computer-readable medium having code for determining, at a first UE functioning as a relay, that no UEs are being served by the first UE, for increasing an interval between broadcast signals based on the determination; and transmitting the broadcast signals according to the increased interval.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

When a large number of activated relay UEs exist in a given area, the relay UEs may create a "pilot pollution" scenario, where the relay UEs may reduce the SNR (call quality) for a terminal UE. In addition, this may waste the battery life of the relay UEs, particularly when a similar coverage may be achieved with a lower number of relay UEs for the area. Certain aspects of the present disclosure provide a sleep mode for relay UEs, which may reduce interference among the relay UEs, as well as reduce battery consumption of the relay UEs.

While certain aspects presented herein may be used with out-of-band-relays that communicate with other UEs on "access hop" channels (e.g., unlicensed white-space spectrum) outside of frequency bands used to communicate with a serving base station on a "backhaul hop" (e.g., licensed spectrum), these aspects may be readily applied to in-band/out-of-band relays using licensed spectrum (e.g., LTE spectrum) for both backhaul and access, as well as to UE Relays with non-LTE backhaul (e.g., including wired backhaul).

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

An Example Wireless Communication System

Figure 1:
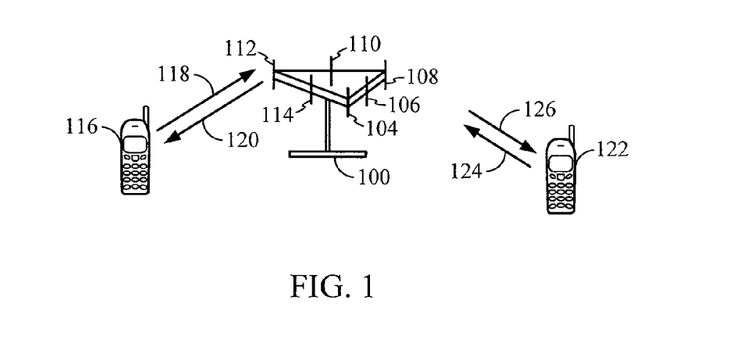
FIG. 1 illustrates an example wireless communication system according to an aspect of the present disclosure.

Referring to FIG. 1, a multiple access wireless communication system according to one embodiment is illustrated. An access point 100 (AP) includes multiple antenna groups, one including antenna 104 and antenna 106, another including antenna 108 and antenna 110, and yet another including antenna 112 and antenna 114. In FIG. 1, only two antennas are shown for each antenna group; however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point (AP) may be a fixed station used for communicating with the terminals and may also be referred to as a base station (BS), a Node B, or some other terminology. An access terminal may also be called a mobile station (MS), user equipment (UE), a wireless communication device, terminal, user terminal (UT), or some other terminology.

Figure 2:
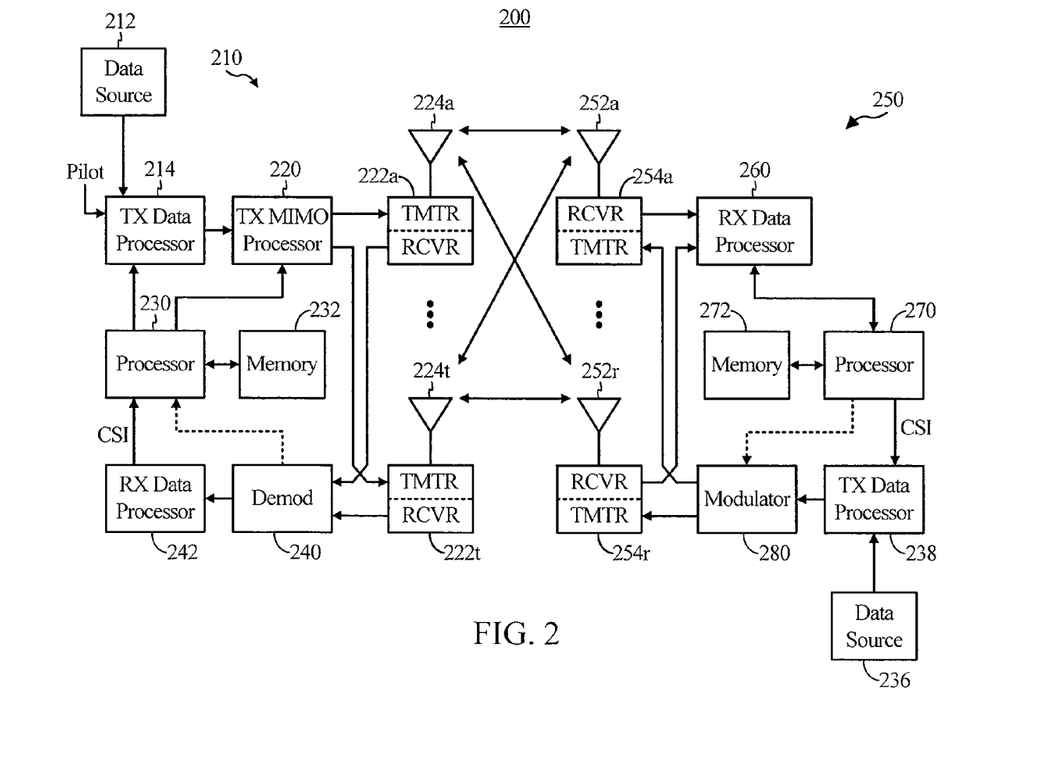
FIG. 2 is a block diagram conceptually illustrating an example of a Node B in communication with a user equipment device (UE) in a wireless communication system, according to an aspect of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH) which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), a Physical Downlink Shared Channel (PDSCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Scheduling Request (SR), a Physical Uplink Shared Channel (PUSCH), and a plurality of PHY channels. The PHY channels comprise a set of DL channels and UL channels.

In an aspect, a channel structure is provided that preserves low PAR (at any given time, the channel is contiguous or uniformly spaced in frequency) properties of a single carrier waveform.

Figure 3:
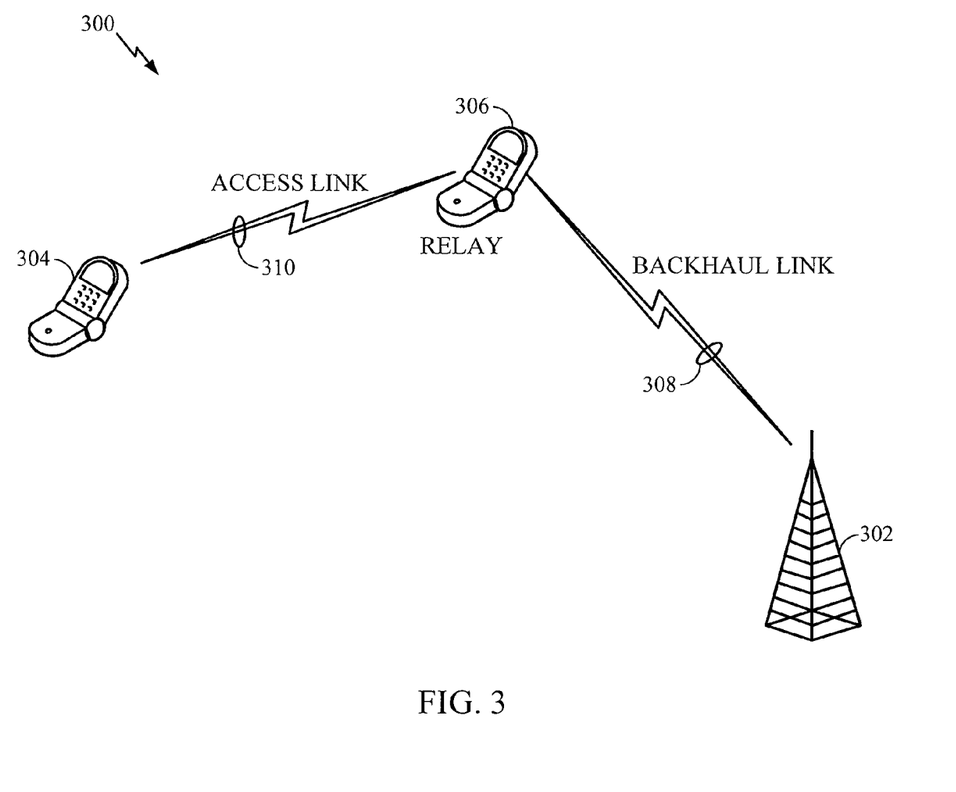
FIG. 3 illustrates an example wireless communications system with a relay UE according to an aspect of the present disclosure.

For the purposes of the present document, the following abbreviations (including abbreviations for various DL and UL PHY Channels) apply:

1×CSFB Circuit Switched Fallback to 1×RTT
ABS Almost Blank Subframe
ACK Acknowledgement
ACLR Adjacent Channel Leakage Ratio
AM Acknowledged Mode
AMBR Aggregate Maximum Bit Rate
ANR Automatic Neighbour Relation
ARQ Automatic Repeat Request
ARP Allocation and Retention Priority
AS Access Stratum
BCCH Broadcast Control Channel
BCH Broadcast Channel
BSR Buffer Status Report
C/I Carrier-to-Interference Power Ratio
CAZAC Constant Amplitude Zero Auto-Correlation
CA Carrier Aggregation
CBC Cell Broadcast Center
CC Component Carrier
CIF Carrier Indicator Field
CMAS Commercial Mobile Alert Service
CMC Connection Mobility Control
CP Cyclic Prefix
C-plane Control Plane
C-RNTI Cell RNTI
CQI Channel Quality Indicator
CRC Cyclic Redundancy Check
CSA Common Subframe Allocation
CSG Closed Subscriber Group
DCCH Dedicated Control Channel
DeNB Donor eNB
DFTS DFT Spread OFDM
DL Downlink
DRB Data Radio Bearer
DRX Discontinuous Reception
DTCH Dedicated Traffic Channel
DTX Discontinuous Transmission
DwPTS Downlink Pilot Time Slot
ECGI E-UTRAN Cell Global Identifier
ECM EPS Connection Management
EMM EPS Mobility Management
E-CID Enhanced Cell-ID (positioning method)
eNB E-UTRAN NodeB
EPC Evolved Packet Core
EPS Evolved Packet System
E-RAB E-UTRAN Radio Access Bearer
ETWS Earthquake and Tsunami Warning System
E-UTRA Evolved UTRA
E-UTRAN Evolved UTRAN
FDD Frequency Division Duplex
FDM Frequency Division Multiplexing
GERAN GSM EDGE Radio Access Network
GNSS Global Navigation Satellite System
GSM Global System for Mobile communication
GBR Guaranteed Bit Rate
GP Guard Period
HARQ Hybrid ARQ
HO Handover
HRPD High Rate Packet Data
HSDPA High Speed Downlink Packet Access
ICIC Inter-Cell Interference Coordination
IP Internet Protocol
LB Load Balancing
LCG Logical Channel Group
LCR Low Chip Rate
LCS LoCation Service
LIPA Local IP Access
LPPa LTE Positioning Protocol Annex
L-GW Local Gateway
LTE Long Term Evolution
MAC Medium Access Control
MBMS Multimedia Broadcast Multicast Service
MBR Maximum Bit Rate
MBSFN Multimedia Broadcast multicast service Single Frequency Network
MCCH Multicast Control Channel
MCE Multi-cell/multicast Coordination Entity
MCH Multicast Channel
MCS Modulation and Coding Scheme
MDT Minimization of Drive Tests
MIB Master Information Block
MIMO Multiple Input Multiple Output
MME Mobility Management Entity
MSA MCH Subframe Allocation
MSI MCH Scheduling Information
MSP MCH Scheduling Period
MTCH Multicast Traffic Channel
NACK Negative Acknowledgement
NAS Non-Access Stratum
NCC Next Hop Chaining Counter
NH Next Hop key
NNSF NAS Node Selection Function
NR Neighbour cell Relation
NRT Neighbour Relation Table
OFDM Orthogonal Frequency Division Multiplexing
OFDMA Orthogonal Frequency Division Multiple Access
OTDOA Observed Time Difference Of Arrival (positioning method)
P-GW PDN Gateway
P-RNTI Paging RNTI
PA Power Amplifier
PAPR Peak-to-Average Power Ratio
PBCH Physical Broadcast CHannel
PBR Prioritised Bit Rate
PCC Primary Component Carrier
PCCH Paging Control Channel
PCell Primary Cell
PCFICH Physical Control Format Indicator CHannel
PCH Paging Channel
PCI Physical Cell Identifier
PDCCH Physical Downlink Control CHannel
PDSCH Physical Downlink Shared CHannel
PDCP Packet Data Convergence Protocol
PDN Packet Data Network
PDU Protocol Data Unit
PHICH Physical Hybrid ARQ Indicator CHannel
PHY Physical layer
PLMN Public Land Mobile Network
PMCH Physical Multicast CHannel
PRACH Physical Random Access CHannel
PRB Physical Resource Block
PSC Packet Scheduling
PUCCH Physical Uplink Control CHannel
PUSCH Physical Uplink Shared CHannel
PWS Public Warning System
QAM Quadrature Amplitude Modulation
QCI QoS Class Identifier
QoS Quality of Service
RA-RNTI Random Access RNTI
RAC Radio Admission Control
RACH Random Access Channel
RAT Radio Access Technology RB Radio Bearer
RBC Radio Bearer Control
RF Radio Frequency
RIM RAN Information Management
RLC Radio Link Control
RN Relay Node
RNC Radio Network Controller
RNL Radio Network Layer
RNTI Radio Network Temporary Identifier
ROHC Robust Header Compression
RRC Radio Resource Control
RRM Radio Resource Management
RU Resource Unit
S-GW Serving Gateway
S1-MME S1 for the control plane
SCC Secondary Component Carrier
SCell Secondary Cell
SI System Information
SIB System Information Block
SI-RNTI System Information RNTI
S1-U S1 for the user plane
SAE System Architecture Evolution
SAP Service Access Point
SC-FDMA Single Carrier—Frequency Division Multiple Access
SCH Synchronization Channel
SDF Service Data Flow
SDMA Spatial Division Multiple Access
SDU Service Data Unit
SeGW Security Gateway
SFN System Frame Number
SPID Subscriber Profile ID for RAT/Frequency Priority
SR Scheduling Request
SRB Signalling Radio Bearer
SU Scheduling Unit
TA Tracking Area
TB Transport Block
TCP Transmission Control Protocol
TDD Time Division Duplex
TEID Tunnel Endpoint Identifier
TFT Traffic Flow Template
TM Transparent Mode
TNL Transport Network Layer
TTI Transmission Time Interval
UE User Equipment
UL Uplink
UM Unacknowledged Mode
UMTS Universal Mobile Telecommunication System
U-plane User plane
UTRA Universal Terrestrial Radio Access
UTRAN Universal Terrestrial Radio Access Network
UpPTS Uplink Pilot Time Slot
VRB Virtual Resource Block
X2-C X2-Control plane
X2-U X2-User plane An Example Relay System FIG. 3 illustrates an example wireless system 300 in which certain aspects of the present disclosure may be practiced. As illustrated, the system 300 includes a donor base station (BS) 302 (also known as donor access point or a donor evolved Node B (DeNB)) that communicates with a user equipment (UE) 304 via a relay node 306 (also known as a relay station or a relay). While the relay node 306 may comprise a relay base station (also known as a relay eNB), a UE (e.g., a cell phone) may also function as a relay for relaying transmissions for other UEs, as shown in FIG. 3. Such relays may be known as relay UEs, UE relays, or UEs functioning as relays.

The relay node 306 may communicate with the donor BS 302 via a backhaul link 308 and with the UE 304 via an access link 310. In other words, the relay node 306 may receive downlink messages from the donor BS 302 over the backhaul link 308 and relay these messages to the UE 304 over the access link 310. Similarly, the relay node 306 may receive uplink messages from the UE 304 over the access link 310 and relay these messages to the donor BS 302 over the backhaul link 308. In this manner, the relay node 306 may, thus, be used to supplement a coverage area and help fill "coverage holes."

Example Power/Complexity Reduction Techniques for UE Relays

Introduction: UE Relay Types and Modes

As noted above, while aspects of the present disclosure may be utilized to particular advantage with out-of-band relays with backhaul hops on licensed spectrum and access hops on unlicensed spectrum (e.g., the television white space or TVWS spectrum), the techniques presented herein may be easily extended to in-band/out-of-band relays using licensed LTE spectrum for both backhaul and access hops, as well as to UE Relays with non-LTE backhaul (including wired backhauls).

In general, UE relays may be considered as falling into two defined classes: (1) power-constrained (e.g., battery-operated) UE relays and (2) power-unconstrained (e.g., wall-connected) UE relays. Techniques utilized by each may differ based on their different needs to conserve power.

For example, power-unconstrained UE relays may operate in an "always-on" fashion on the access hop, whether or not such UE relays are currently serving any terminal UEs on the access hop. However, these UE relays may go into discontinuous reception (DRX) or another power-saving mode on the backhaul hop. Basically, power-unconstrained UE relays may be intended to be capable of serving legacy UEs (e.g., UEs that operate according to a previous version of a standard as contrasted with "non-legacy" UEs capable of operating with later versions of a standard) that have RF support to operate the access hop spectrum.

On the other hand, power-constrained UE relays may operate in a newly defined power-saving mode when such UE relays are idle on the access hop, while these UE relays behave like regular eNBs when they are active on the access hop. A power-constrained UE relay may switch from active mode to idle mode (standby mode) when the UE relay is no longer serving any terminal UEs and may switch from idle mode to active mode when the UE relay detects an access attempt by a terminal UE. Of course, in order to operate in either of these two modes, the network or donor eNB (DeNB) typically must authorize the UE relay to serve other terminal UEs, and the UE relay generally must have adequate capacity on its backhaul.

Certain aspects of the present disclosure may be used to particular advantage with power-constrained UE relays, whether these UE relays are idle or active on the access hop. It is to be understood that power-unconstrained UE relays may behave just like power-constrained UE relays that are always in active mode on the access hop. As noted before, an advantage of power-unconstrained UE relays is that they are able to serve so called legacy LTE UEs that are capable of operating in the access hop spectrum (from the RF perspective).

Out-of-Band Beacons

Each type of UE relay (power-constrained or otherwise, active or idle on the access hop) may transmit an out-of-band beacon on zero or more "rendezvous" channels that are designated by the operator(s) and well-known to the terminal UEs. One of these rendezvous channels may coincide with the licensed channel used for the backhaul hop of the UE relay.

In addition to out-of-band beacons, UE relays that are idle on the access hop may transmit in-band beacons on their access hop spectrum, while UE relays that are active on the access hop may transmit their regular broadcast signals (e.g., Primary Synchronization Signal (PSS), Secondary Synchronization Signal (SSS), Physical Broadcast Channel (PBCH), System Information Block (SIB), etc.).

The purpose of the out-of-band beacons may be to reduce the search complexity for terminal UEs looking for UE relays. These beacons may be used for discovery and (relatively) coarse timing/frequency acquisition of the UE relays by the access UEs (as well as by other UE relays for access hop channel-selection purposes). Hence, an out-of-band beacon may be based on a proximity detection signal (PDS)-like design (maybe even a PUSCH-like waveform that uses just half of a resource block (RB)). As used herein, the term PDS generally refers to a special signature sequence known at a receiver that is transmitted relatively infrequently by a transmitter.

The transmit power of the out-of-band beacon may be different from the beacon's transmit power on its access hop, possibly to provide for any best-effort compensation for the expected path-loss differential between the rendezvous frequency and the access hop frequency.

In addition to UE reference signals (RSs), the out-of-band beacon may contain a PUSCH-like transmission which is used to carry a payload with one or more of the following pieces of information: (1) a pointer to the frequency used for the access hop; (2) optionally, the physical cell identifier (PCI) selected by the UE relay for its access hop; and (3) the time offset between the out-of-band beacon transmission on the rendezvous channel and the in-band beacon transmission. These parameters may be any suitable size and format, for example, approximately 16 bits for the pointer to the access hop frequency and/or 10 bits for the UE relay PCI. In some cases, the out-of-band beacon may indicate the periodicity in the case of a UE relay that is idle on the access hop, or for other aspects, the time offset between the out-of-band beacon transmission on the rendezvous channel and the super-frame boundary on the access hop frequency, in the case of a UE relay that is active on the access hop (which may be approximately 16 bits). Assuming 16 bits or less for three parameters implies less than 48 bits of payload overall, which may fit in half of an RB.

Each DeNB may designate certain subframes for out-of-band beacons. For example, a DeNB may designate 1 in every N subframes, with N being a relatively large number (e.g., on the order of 1000) for out-of-band beacons. Different rendezvous channels may use different subframes for out-of-band beacon transmissions (e.g., in an effort to ease RF requirements on the UE relays, albeit possibly at the expense of battery life-as a UE would have to scan more subframes to detect a relay).

Among these so-called "beacon subframes," each UE relay may pick 1 out of M beacon subframes, as well as a PDS resource (e.g., 1 RB or half an RB) to transmit the UE relay's out-of-band beacons during the selected beacon subframes. The selection of beacon subframes and a PDS resource by a given UE relay may be random or based on a listen-and-pick scheme. In a synchronous LTE network, adjacent DeNBs may designate the same subset of subframes for out-of-beacon transmissions on a given rendezvous channel, in an effort to facilitate search performance at the terminal UEs.

In-Band Beacons

According to certain aspects, a UE relay that is idle on the access hop may transmit an in-band beacon on the frequency the UE relay has chosen for its access hop. The purpose of the in-band beacon may be to enable fine timing and frequency acquisition by the terminal UEs, as well as the system parameters governing the UE relay operation. Other UE relays may also use these beacons, for example, for access hop channel selection and interference coordination purposes.

According to certain aspects, the in-band beacon may consist of the LTE broadcast channels (e.g., PSS, SSS, PBCH, and/or SIBs) that are transmitted at low duty cycle (as indicated in the out-of-band beacon payload). In fact, an LTE broadcast channel may be considered (for the most part) a special case of an out-of-band beacon payload, which is transmitted with the duty cycle mandated by the current LTE specification.

Note that the SIBs contained in the in-band beacon may include the cell global identification (CGI) of the UE relay, which may be used to uniquely identify the UE relay for interference management and mobility purposes (e.g., in a closed subscriber group (CSG)).

In addition, when the UE relay is actually idle on the access hop, the UE relay may specify low duty cycle random access channel (RACH) configuration (perhaps lower duty cycle than what is current in the standard), which may be used by a terminal UE to access the UE relay, and also to trigger the transmission of the UE relay from idle mode to active mode on the access hop.

Waveform Choice for the Two Beacon Types

As noted above, a PDS-like solution may be chosen for out-of-band beacons, but the legacy broadcast channel for in-band beacons. This PDS-based solution may be well-suited to carry small payloads by a large number of nodes using a small fraction of signal resources. This may be important for out-of-band beacons, which may support UE relays operating on a possibly large number of distinct access frequencies/bands to advertise their presence on a common rendezvous channel. On the other hand, the PDS-based waveform only provides coarse timing/frequency reference to the receivers, which may most likely be sufficient for UE relay discovery.

By contrast, a PSS-/SSS-/PBCH-based solution may provide finer timing/frequency reference, as well as the ability to carry larger amounts of payload (multiple SIBs) in a legacy-compatible manner. Both of these are desirable features for these in-band beacons, as well as for the regular broadcast channels.

Example Sleep Mode for UE Relays

Several issues may arise when a large number of activated relay UEs exist in a given area. For example, a large number of relay UEs may create a "pilot pollution" scenario, where the large number of relay UEs may reduce the SNR (call quality) for a terminal UE. In addition, this may waste the battery life of the relay UEs, particularly when a similar coverage may be achieved with a lower number of relay UEs for the area. Furthermore, high interference among relay UEs may lead to a lower throughput (i.e., a lower data rate).

Accordingly, what is needed are techniques and apparatus for reducing interference among relay UEs and/or reducing battery consumption of the relay UEs. Certain aspects of the present disclosure provide a sleep mode for relay UEs, which may reduce interference among the relay UEs, as well as reduce battery consumption of the relay UEs.

For certain aspects, interference reduction among the relay UEs may involve subframe muting, where a relay UE may not transmit any signal in a particular subframe. Subframe muting may occur prior to the relay UE entering a power-saving state, such as sleep mode or discontinuous reception (DRX) mode. To accomplish subframe muting, an eNB, such as the base station 302, may configure one or more relay UEs with alternating muting patterns. The configuration of the relay UEs may be accomplished using dedicated RRC (or higher layer signaling) or broadcast messages transmitted by the eNB. Each pattern generally includes subframes where a particular relay UE, may not transmit any signals, thereby allowing this relay UE to mute its own transmissions and measure signals from other relay UEs. As a consequence, the measuring relay UE may report the measurements of the other relay UEs' transmissions to the eNB. The eNB may then determine which relay UEs to turn off.

For certain aspects, additional information may be useful to the eNB in determining which relay UEs to turn off. This information may be available through RRM measurement reporting and/or radio bearer configuration. Such additional information may include RRM measurements for relay UEs by served UEs, the configuration of the radio bearers for UEs served by the relay UEs, and/or the queue size of buffered data at the relay UEs. The queue size may be classified per radio bearer for UEs served by a relay UE.

For certain aspects, interference reduction among the relay UEs may involve a discontinuous reception (DRX) mode procedure. For example, a relay UE that does not serve any UEs for an extended period of time may start increasing the period of time between Primary Synchronization Signal (PSS), Secondary Synchronization Signal (SSS), or Physical Broadcast Channel (PBCH) transmissions. Furthermore, subframes for transmitting a common reference signal (CRS) or any other signals for channel state information (CSI) feedback or radio resource management (RRM) measurements may also be adjusted.

As described above, there may be two classes of UE relays: power-constrained and power-unconstrained UE relays. The DRX procedure (sleep mode) may typically apply to power-constrained UE relays, but the DRX procedure has system benefits since it reduces interference (e.g., relay UEs not serving any UEs reduce periodicity of the overhead channels).

For certain aspects, an eNB may control the relay UE DRX mode procedure. This control may be accomplished through radio resource control (RRC) or media access control (MAC) signaling. The relay UE may transmit acquisition signals and/or other reference signals (RSs) (e.g., CRS RS, CSI RS, etc.) with reduced (minimum) periodicity when not serving any terminal UEs. However, the interval between these signals may be reduced to a nominal value (e.g., a default interval value) if the UE relay device is configured to serve at least one UE.

Figure 4:
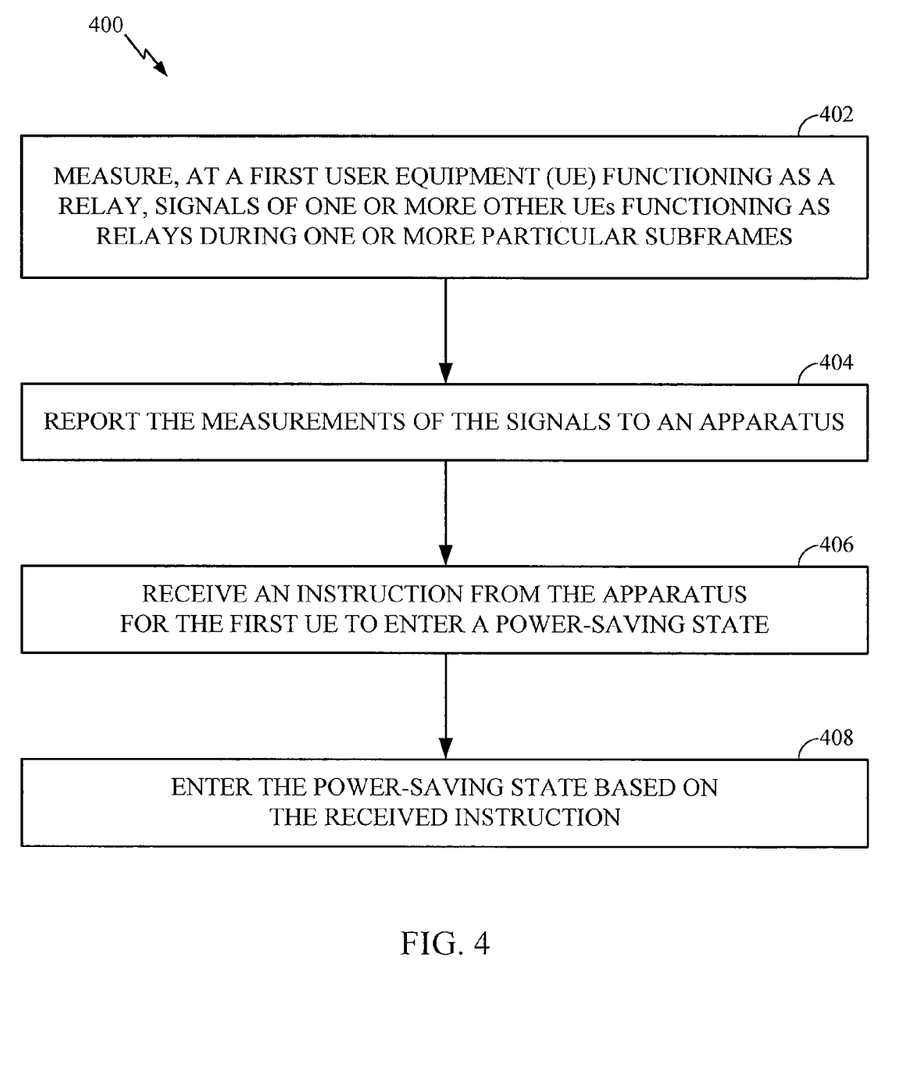
FIG. 4 is a flow diagram of example operations for subframe muting from the perspective of a UE relay, for example, according to an aspect of the present disclosure.

FIG. 4 is a flow diagram of example operations 400 for subframe muting, in accordance with certain aspects of the present disclosure. The operations 400 may be performed from the perspective of a UE functioning as a relay (i.e., a UE relay). At 402, the UE may measure signals of one or more other UEs functioning as relays during one or more particular subframes. The UE typically does not transmit during the particular subframes, so that the UE may effectively listen to the signals from the other UEs. At 404, the UE may report the measurements of the signals to an apparatus, such as an eNB.

For certain aspects, the UE functioning as the relay may measure the signals during the particular subframes according to a subframe pattern, such as the alternating muting patterns described above. An indication of this subframe pattern may be received from the apparatus, for example.

For certain aspects, the UE functioning as the relay may receive an instruction from the apparatus for the UE to enter a power-saving state, such as sleep mode or DRX mode, at 406. At 408, the UE may enter the power-saving state based on the received instruction. For certain aspects, the instruction may be based on the reported measurements.

For certain aspects, the UE functioning as the relay may determine that no UEs are being served by the UE and, based on the determination, the UE functioning as the relay may enter a low power state. As an example, the UE functioning as the relay may increase an interval between broadcast signals when in the low power state.

Figure 5:
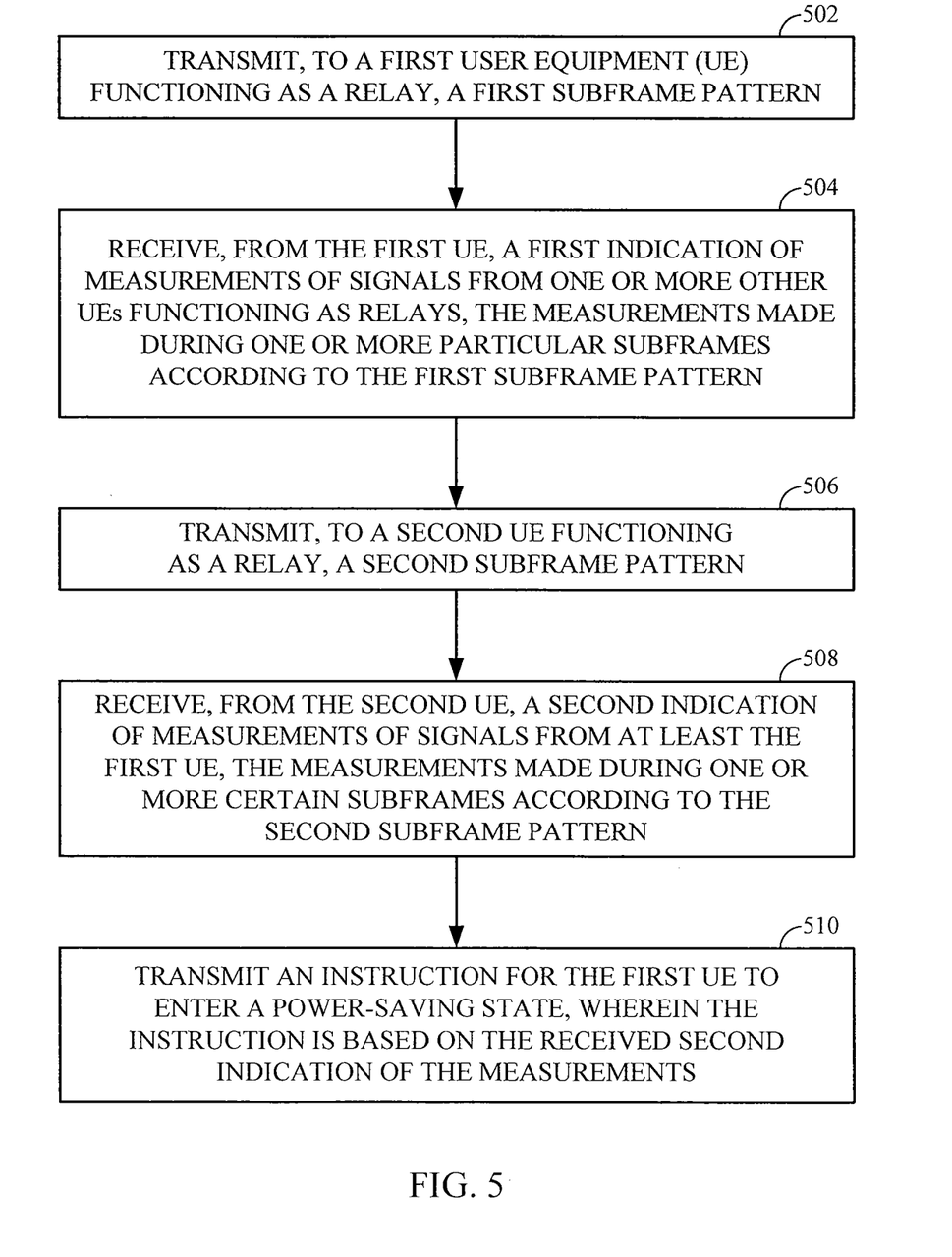
FIG. 5 is a flow diagram of example operations for subframe muting from the perspective of an evolved Node B (eNB), for example, according to an aspect of the present disclosure.

FIG. 5 is a flow diagram of example operations 500 for subframe muting, in accordance with certain aspects of the present disclosure. The operations 500 may be performed from the perspective of an eNB, for example. At 502, the eNB may transmit a first subframe pattern to a first UE functioning as a relay (i.e., a first UE relay). At 504, the eNB may receive, from the first UE, a first indication of measurements of signals from one or more other UEs functioning as relays. The measurements may be made during one or more particular subframes according to the first subframe pattern. The first UE typically does not transmit during the particular subframes, so that the first UE may effectively listen to the signals from the other UEs.

For certain aspects, the eNB may transmit a second subframe pattern to a second UE functioning as a relay (i.e., a second UE relay) at 506. At 508, the eNB may receive, from the second UE, a second indication of measurements of signals from at least a portion of the other UEs (which may include at least the first UE). These measurements may be made during one or more certain subframes according to the second subframe pattern, which is typically different from the first subframe pattern. The second UE typically does not transmit during the certain subframes, so that the second UE may effectively listen to signals from other UEs.

For certain aspects, the eNB may transmit an instruction for the first UE to enter a power-saving state, such as sleep mode or DRX mode, at 510. The instruction may be based on the received second (or first) indication of the measurements.

Figure 6:
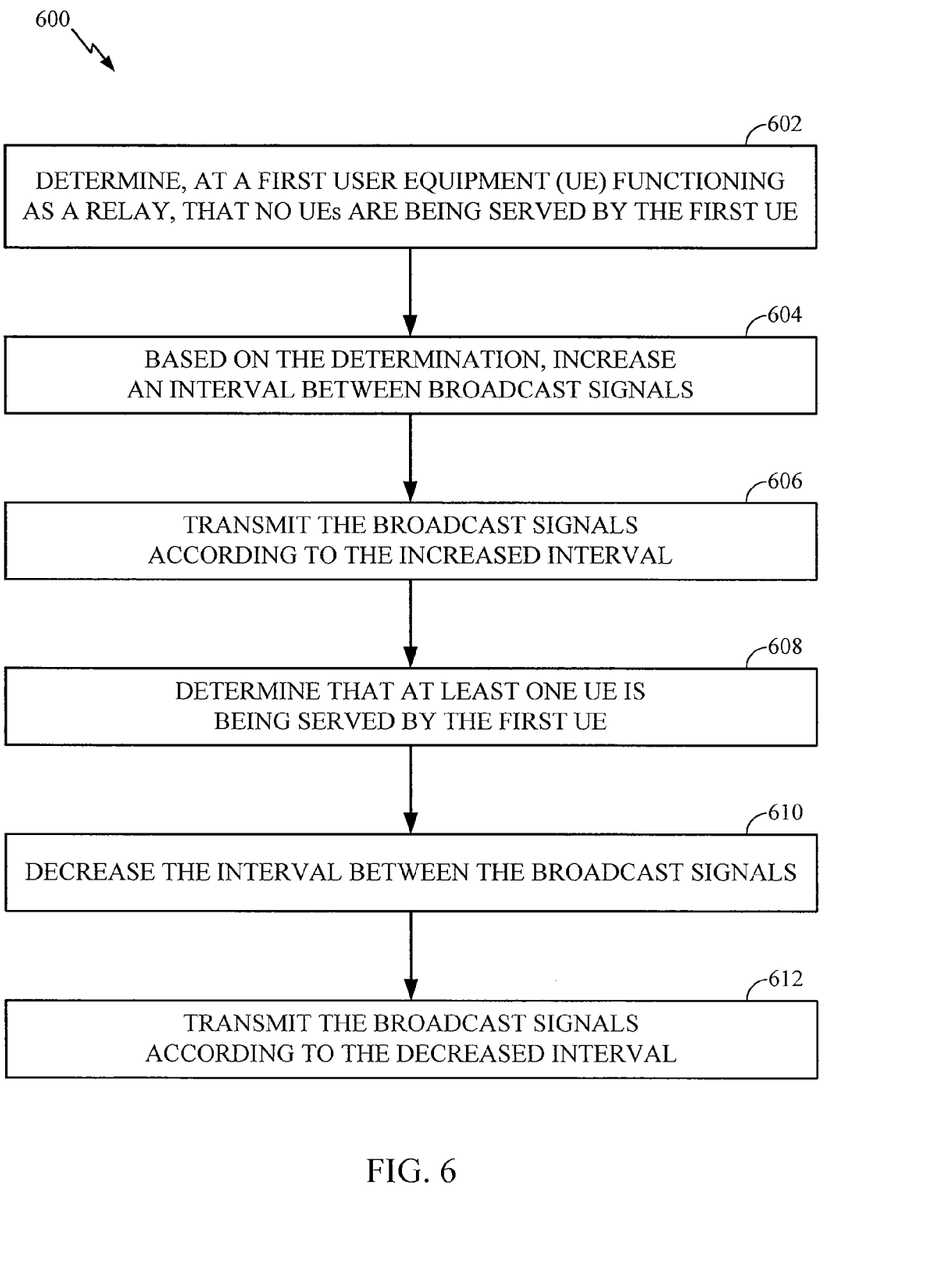
FIG. 6 is a flow diagram of example operations for discontinuous reception (DRX) mode from the perspective of a UE relay, for example, according to an aspect of the present disclosure.

FIG. 6 is a flow diagram of example operations 600 for discontinuous reception (DRX) mode, in accordance with certain aspects of the present disclosure. The operations 600 may be performed from the perspective of a first UE functioning as a relay (i.e., a UE relay). At 602, the first UE may determine that no UEs are being served by the first UE. This determination may be made for a particular length of time (e.g., a threshold duration). At 604, the first UE may increase an interval between broadcast signals based on the determination at 602. For certain aspects, the broadcast signals may comprise at least one of a PSS, SSS, or PBCH. For other aspects, the broadcast signals may comprise common reference signals (CRSs) or signals for at least one of CSI or RRM measurements. At 606, the first UE may transmit the broadcast signals according to the increased interval.

For certain aspects, the first UE may subsequently determine that at least one UE is being served by the first UE at 608. At 610, the first UE may decrease the interval between the broadcast signals, perhaps down to a default or nominal level. At 612, the first UE may transmit the broadcast signals according to the decreased interval.

Figure 4A:
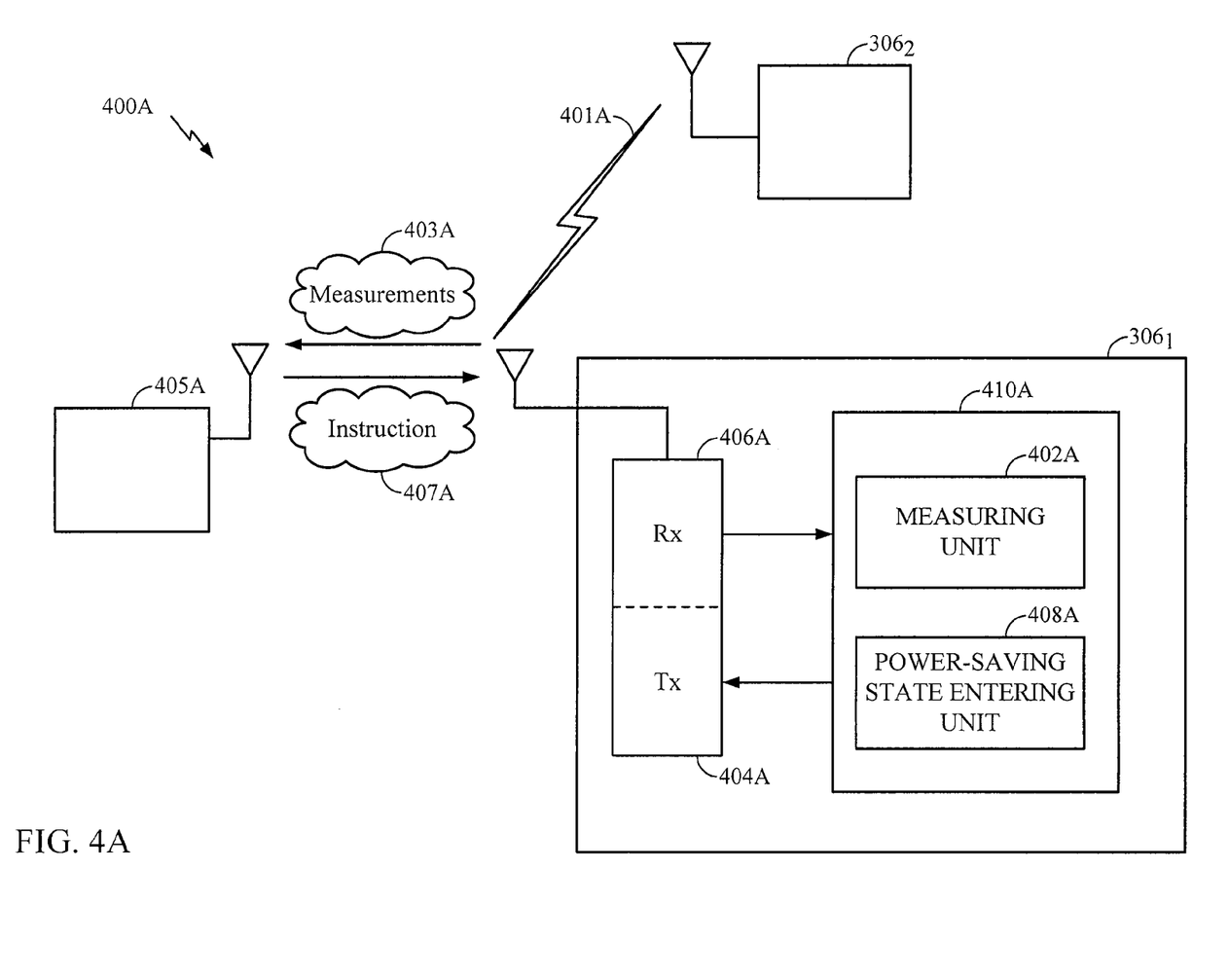
FIG. 4A illustrates example components capable of performing the operations illustrated in FIG. 4.

The operations 400 described above may be performed by any suitable components or other means capable of performing the corresponding function of FIG. 4. For example, operations 400 illustrated in FIG. 4 correspond to components 400A illustrated in FIG. 4A. In FIG. 4A, a measuring unit 402A located in a processor 410A of a UE relay $306_1$ may measure signals (at 401A) of at least another UE relay $306_2$ during one or more particular subframes. A transmitter 404A of the UE relay $306_1$ may report measurements 403A of the signals to an apparatus 405A (e.g., eNB). A receiver 406A of the UE relay $306_1$ may receive an instruction 407A from the apparatus 405A for the UE relay $306_1$ to enter a power-saving state. A power-saving state entering unit 408A located in the processor 410A of the UE relay $306_1$ may enter the power-saving state based on the received instruction 407A.

Figure 5A:
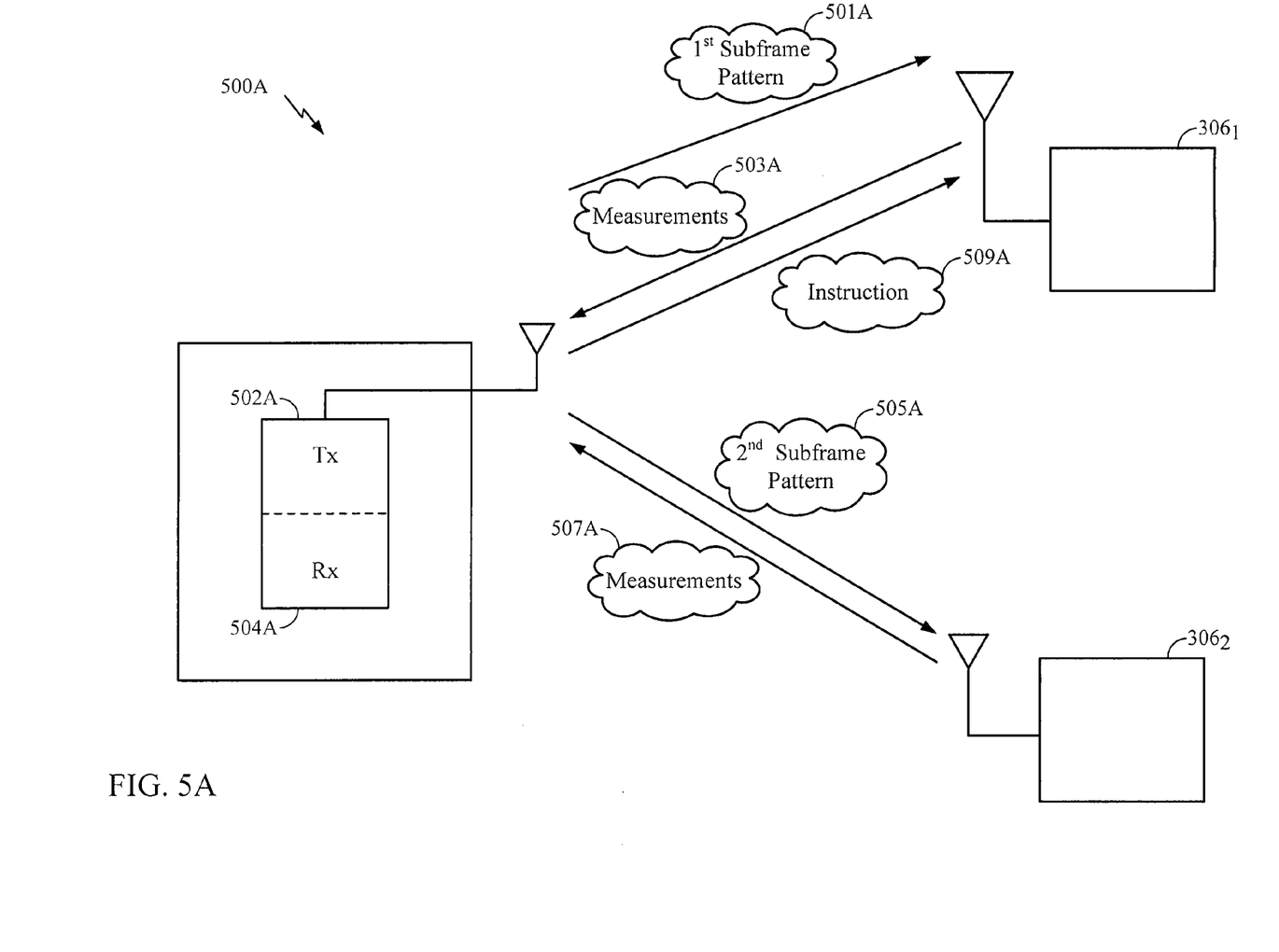
FIG. 5A illustrates example components capable of performing the operations illustrated in FIG. 5.

The operations 500 described above may be performed by any suitable components or other means capable of performing the corresponding function of FIG. 5. For example, operations 500 illustrated in FIG. 5 correspond to components 500A illustrated in FIG. 5A. In FIG. 5A, a transmitter 502A of an apparatus (e.g., eNB) may transmit, to a first UE relay $306_1$, a first subframe pattern 501A. A receiver 504A of the apparatus may receive, from the first UE relay $306_1$, a first indication of measurements 503A of signals from one or more other UE relays, the measurements made during one or more particular subframes according to the first subframe pattern 501A. The transmitter 502A of the apparatus may transmit, to a second UE relay $306_2$, a second subframe pattern 505A. The receiver 504A of the apparatus may receive, from the second UE relay $306_2$, a second indication of measurements 507A of signals from at least the first UE relay $306_1$, the measurements made during one or more certain subframes according to the second subframe pattern 505A. The transmitter 502A of the apparatus may transmit an instruction 509A for the first UE relay $306_1$ to enter a power-saving state.

Figure 6A:
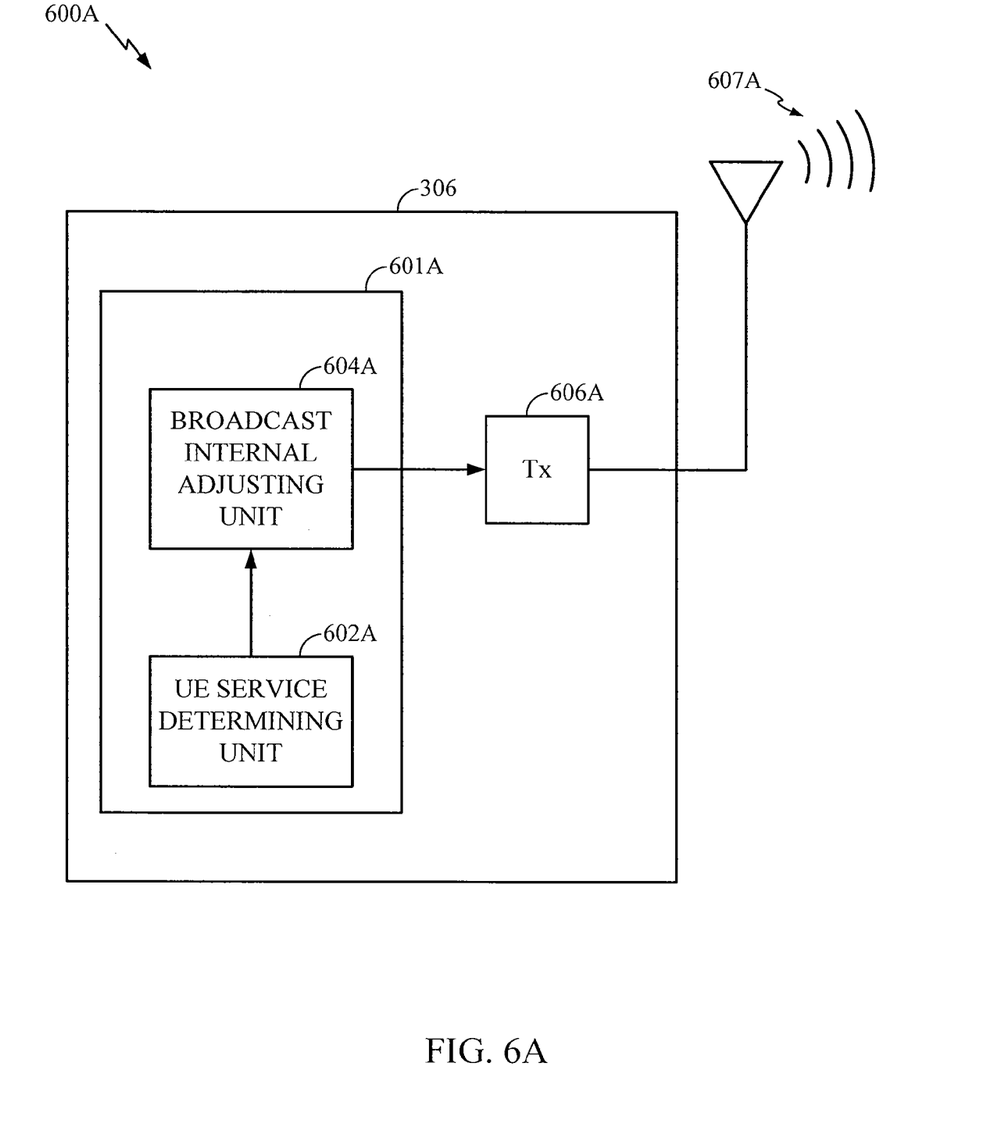
FIG. 6A illustrates example components capable of performing the operations illustrated in FIG. 6.

The operations 600 described above may be performed by any suitable components or other means capable of performing the corresponding function of FIG. 6. For example, operations 600 illustrated in FIG. 6 correspond to components 600A illustrated in FIG. 6A. In FIG. 6A, a UE service determining unit 602A located in a processor 601A of a UE relay 306 may determine that no UEs are being served by the UE relay 306. Based on the determination, a broadcast internal adjusting unit 604A located in the processor 601A of the UE relay 306 may increase an interval between broadcast signals. A transmitter 606A of the UE relay 306 may transmit the broadcast signals (at 607A) according to the increased interval. The UE service determining unit 602A may determine that at least one UE is being served by the UE relay 306. The broadcast internal adjusting unit 604A may decrease the interval between the broadcast signals. The transmitter 606A of the UE relay 306 may transmit the broadcast signals (at 607A) according to the decreased interval.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

For example, means for transmitting or means for reporting may comprise a transmitter (e.g., a transmitter 222) and/or an antenna 224 of the transmitter system 210 or a transmitter (e.g., a transmitter 254) and/or an antenna 252 of the receiver system 250 illustrated in FIG. 2. Means for receiving may comprise a receiver (e.g., a receiver 254) and/or an antenna 252 of the receiver system 250 or a receiver (e.g., a receiver 222) and/or an antenna 224 of the transmitter system 210 illustrated in FIG. 2. Means for processing, means for determining, means for measuring, means for entering (a power-saving state), means for increasing, or means for decreasing may comprise a processing system, which may include at least one processor, such as the RX data processor 260, the processor 270, and/or the TX data processor 238 of the receiver system 250 or the RX data processor 242, the processor 230, and/or the TX data processor 214 of the transmitter system 210 illustrated in FIG. 2.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
transmitting, to a first user equipment (UE) functioning as a relay, a first alternating subframe muting pattern for use by UEs functioning as relays;
receiving, from the first UE, a first indication of measurements of signals from one or more other UEs functioning as relays, the measurements made during one or more particular subframes according to the first alternating subframe muting pattern;
transmitting, to a second UE functioning as a relay, a second alternating subframe muting pattern; and
receiving, from the second UE, a second indication of measurements of signals from at least the first UE, the measurements made during one or more certain subframes according to the second alternating subframe muting pattern.

2. The method of claim 1, further comprising transmitting an instruction for the first UE to enter a power-saving state.

3. The method of claim 2, wherein the instruction is based on the received first indication of the measurements.

4. The method of claim 1, further comprising transmitting an instruction for the first UE to enter a power-saving state.

5. The method of claim 4, wherein the instruction is based on the received second indication of the measurements.

6. The method of claim 1, wherein the second alternating subframe muting pattern is different from the first alternating subframe muting pattern.

7. An apparatus for wireless communications, comprising:
a transmitter configured to transmit, to a first user equipment (UE) functioning as a relay, a first alternating subframe muting pattern for use by UEs functioning as relays; and
a receiver configured to receive, from the first UE, a first indication of measurements of signals from one or more other UEs functioning as relays, the measurements made during one or more particular subframes according to the first alternating subframe muting pattern,
wherein the transmitter is configured to transmit, to a second UE functioning as a relay, a second alternating subframe muting pattern and wherein the receiver is configured to receive, from the second UE, a second indication of measurements of signals from at least the first UE, the measurements made during one or more certain subframes according to the second alternating subframe muting pattern.

8. The apparatus of claim 7, wherein the transmitter is configured to transmit an instruction for the first UE to enter a power-saving state.

9. The apparatus of claim 8, wherein the instruction is based on the received first indication of the measurements.

10. The apparatus of claim 7, wherein the transmitter is configured to transmit an instruction for the first UE to enter a power-saving state.

11. The apparatus of claim 10, wherein the instruction is based on the received second indication of the measurements.

12. The apparatus of claim 7, wherein the second alternating subframe muting pattern is different from the first alternating subframe muting pattern.

13. An apparatus for wireless communications, comprising:
means for transmitting, to a first user equipment (UE) functioning as a relay, a first alternating subframe muting pattern for use by UEs functioning as relays; and
means for receiving, from the first UE, a first indication of measurements of signals from one or more other UEs functioning as relays, the measurements made during one or more particular subframes according to the first alternating subframe muting pattern,
wherein the means for transmitting is configured to transmit, to a second UE functioning as a relay, a second alternating subframe muting pattern and wherein the means for receiving is configured to receive, from the second UE, a second indication of measurements of signals from at least the first UE, the measurements made during one or more certain subframes according to the second alternating subframe muting pattern.

14. The apparatus of claim 13, wherein the means for transmitting is configured to transmit an instruction for the first UE to enter a power-saving state.

15. The apparatus of claim 14, wherein the instruction is based on the received first indication of the measurements.

16. The apparatus of claim 13, wherein the means for transmitting is configured to transmit an instruction for the first UE to enter a power-saving state.

17. The apparatus of claim 16, wherein the instruction is based on the received second indication of the measurements.

18. The apparatus of claim 13, wherein the second alternating subframe muting pattern is different from the first alternating subframe muting pattern.

19. A computer-program product for wireless communications, the computer-program product comprising:
a non-transitory computer-readable medium comprising code for:
transmitting, to a first user equipment (UE) functioning as a relay, a first alternating subframe muting pattern for use by UEs functioning as relays;
receiving, from the first UE, a first indication of measurements of signals from one or more other UEs functioning as relays, the measurements made during one or more particular subframes according to the first alternating subframe muting pattern;
transmitting, to a second UE functioning as a relay, a second alternating subframe muting pattern; and
receiving, from the second UE, a second indication of measurements of signals from at least the first UE, the measurements made during one or more certain subframes according to the second alternating subframe muting pattern.

20. The computer-program product of claim 19, further comprising code for transmitting an instruction for the first UE to enter a power-saving state.

21. The computer-program product of claim 20, wherein the instruction is based on the received first indication of the measurements.

22. The computer-program product of claim 19, further comprising code for transmitting an instruction for the first UE to enter a power-saving state.

23. The computer-program product of claim 22, wherein the instruction is based on the received second indication of the measurements.

24. The computer-program product of claim 19, wherein the second alternating subframe muting pattern is different from the first alternating subframe muting pattern.

25. The method of claim 1, wherein the first alternating subframe muting pattern is unique to the first UE.

26. The method of claim 1, wherein the second alternating subframe muting pattern is unique to the second UE.

27. The apparatus of claim 7, wherein the first alternating subframe muting pattern is unique to the first UE.

28. The method of claim 7, wherein the second alternating subframe muting pattern is unique to the second UE.

29. The apparatus of claim 13, wherein the first alternating subframe muting pattern is unique to the first UE.

30. The method of claim 7, wherein the second alternating subframe muting pattern is unique to the second UE.

31. The computer-program product of claim 19, wherein the first alternating subframe muting pattern is unique to the first UE.

32. The method of claim 19, wherein the second alternating subframe muting pattern is unique to the second UE.

\* \* \* \* \*